(12) United States Patent
Brüggemann et al.

(10) Patent No.: US 11,027,718 B2
(45) Date of Patent: *Jun. 8, 2021

(54) BRAKE WEAR REDUCTION APPARATUS

(71) Applicants: AIRBUS OPERATIONS LIMITED, Bristol (GB); AIRBUS OPERATIONS SAS, Toulouse (FR)

(72) Inventors: Kurt Brüggemann, Bristol (GB); Brice Cheray, Bristol (GB); Louis Emmanuel Romana, Bristol (GB)

(73) Assignees: AIRBUS OPERATIONS LIMITED, Bristol (GB); AIRBUS OPERATIONS (SAS), Toulouse (FR)

( * ) Notice: Subject to any disclaimer, the term of this patent is extended or adjusted under 35 U.S.C. 154(b) by 0 days.

This patent is subject to a terminal disclaimer.

(21) Appl. No.: 16/440,807

(22) Filed: Jun. 13, 2019

(65) Prior Publication Data

US 2019/0291708 A1    Sep. 26, 2019

Related U.S. Application Data

(63) Continuation of application No. 15/707,219, filed on Sep. 18, 2017.

(30) Foreign Application Priority Data

Sep. 20, 2016    (GB) ...................................... 1615974

(51) Int. Cl.
*B60T 17/22*    (2006.01)
*B64C 25/42*    (2006.01)
(Continued)

(52) U.S. Cl.
CPC ............ *B60T 17/221* (2013.01); *B60T 8/171* (2013.01); *B60T 8/172* (2013.01); *B60T 8/1703* (2013.01);
(Continued)

(58) Field of Classification Search
CPC ...... B60T 17/221; B60T 8/1703; B60T 8/171; B60T 8/172; B60T 8/1761; B60T 2270/406; B64C 25/42; B64C 25/426; B64C 25/44
See application file for complete search history.

(56) References Cited

U.S. PATENT DOCUMENTS

| 4,078,845 A | 3/1978 | Amberg et al. |
| 5,217,282 A | 6/1993 | Guichard |

(Continued)

FOREIGN PATENT DOCUMENTS

| EP | 0 329 373 | 8/1989 |
| EP | 0 384 071 | 8/1990 |

(Continued)

OTHER PUBLICATIONS

Extended Search Report cited in EP 19174503.3 dated Sep. 12, 2019, 9 pages.

(Continued)

*Primary Examiner* — Navid Ziaeianmehdizadeh
*Assistant Examiner* — Sean P Quinn
(74) *Attorney, Agent, or Firm* — Nixon & Vanderhye P.C.

(57) ABSTRACT

An apparatus for reducing brake wear having a brake de-selection function for selectively disabling at least one brake on a vehicle; and a controller. The controller is configured to receive torque information which relates to torque reacted by a brake on the vehicle during a braking event and wheel speed information which relates to a speed of a wheel associated with the brake during the braking event; calculate an energy input into the brake during the braking event, based on the received torque information and the received wheel speed information; determine whether the calculated energy input meets at least one predefined energy input criterion; and activate the brake de-selection (Continued)

function if the calculated energy input meets the at least one predefined energy input criterion.

9 Claims, 6 Drawing Sheets

(51) Int. Cl.
  *B64C 25/44* (2006.01)
  *B60T 8/17* (2006.01)
  *B60T 8/171* (2006.01)
  *B60T 8/172* (2006.01)
  *B60T 8/1761* (2006.01)

(52) U.S. Cl.
  CPC ............ *B60T 8/1761* (2013.01); *B64C 25/42* (2013.01); *B64C 25/426* (2013.01); *B64C 25/44* (2013.01); *B60T 2270/406* (2013.01)

(56) References Cited

U.S. PATENT DOCUMENTS

| | | | |
|---|---|---|---|
| 5,417,477 A | 5/1995 | Lasbleis | |
| 5,845,975 A | 12/1998 | Wells | |
| 5,957,551 A | 9/1999 | Maron et al. | |
| 6,398,162 B1 | 6/2002 | Stimson et al. | |
| 8,152,246 B2 | 4/2012 | Miller et al. | |
| 8,172,340 B2 | 5/2012 | DeVlieg et al. | |
| 8,311,685 B2 | 11/2012 | Dellac et al. | |
| 8,548,652 B2 | 10/2013 | DeVlieg et al. | |
| 9,242,739 B2 | 1/2016 | Martin | |
| 9,815,443 B2 | 11/2017 | Miller | |
| 2003/0102191 A1 | 6/2003 | DeVlieg | |
| 2004/0065776 A1 | 4/2004 | DeVlieg | |
| 2006/0226698 A1 | 10/2006 | Riebe et al. | |
| 2008/0201025 A1 | 8/2008 | Dellac et al. | |
| 2009/0065640 A1 | 3/2009 | Regis et al. | |
| 2009/0125286 A1* | 5/2009 | Waltz ........................ B60T 5/00 703/5 |
| 2009/0210126 A1 | 8/2009 | Dellac et al. | |
| 2011/0127828 A1 | 6/2011 | Sorin et al. | |
| 2011/0144879 A1 | 6/2011 | Miller et al. | |
| 2012/0154177 A1 | 6/2012 | Wingate | |
| 2015/0286215 A1 | 10/2015 | Alvarado, Jr. et al. | |
| 2016/0318492 A1* | 11/2016 | Miller .................... B64C 25/42 |
| 2018/0297573 A1* | 10/2018 | Alam ................... B60T 8/1703 |

FOREIGN PATENT DOCUMENTS

| | | |
|---|---|---|
| GB | 1 585 321 | 2/1981 |
| GB | 2 423 342 | 8/2006 |
| WO | 2010/088396 | 8/2010 |

OTHER PUBLICATIONS

Search Report cited in EP 17192069.7 dated Feb. 9, 2018, 8 pages.

* cited by examiner

BRAKE WEAR REDUCTION APPARATUS

RELATED APPLICATIONS

This application is a continuation of U.S. patent application Ser. No. 15/707,219, filed Sep. 18, 2017, which claims priority to United Kingdom (GB) patent application 1615974.1 filed Sep. 20, 2016, the entire contents of both of these applications are incorporated by reference.

TECHNICAL FIELD

The present invention relates to an apparatus for reducing brake wear, and in particular to an apparatus for reducing the wear of aircraft brakes.

BACKGROUND

Brake wear is caused by abrasion due to frictional surfaces (e.g. brake discs) of a brake moving against each other. The rate at which a given brake wears is affected by various factors, including contact wheel speed/force; speed of rotation; temperature of the frictional material; type of the frictional material; number of frictional surfaces comprised in the brake; number of brake applications. Research has shown that, for brakes which use carbon as a frictional material, the main controllable contributor to brake wear is the number of brake applications, and that the intensity of each application is not particularly significant in comparison with the number of applications. Therefore, a large number of low intensity brake applications causes more wear than a smaller number of high intensity brake applications.

A number of systems exist which aim to improve the brake life of aircraft brakes by reducing the number of brake applications. For example, US 2004/0065776 describes an algorithm which shuts down ("de-selects") some of an aircraft's brakes during taxiing of that aircraft. The remaining brakes consequently work harder, but the number of braking applications experienced by each individual brake is reduced compared to using all brakes for each brake application during taxiing. Moreover, the algorithm selects brakes to be applied sequentially, such that a given brake will not be used for two successive applications, to avoid any of the brakes overheating. The algorithm of US 2004/0065776 is only operative to de-select brakes in respect of a given application if the speed of the aircraft is below a certain threshold value and if the pressure of the brake fluid (which correlates with the intensity of the braking being requested) is below a certain threshold value. Therefore if either the speed increases past the threshold, or the braking intensity requested by the pilot is too high, then the brake de-selection function will be disabled.

Regulations require aircraft brakes to be able to handle an aborted takeoff at any moment prior to the plane reaching a decision speed known as V1. Brakes should not exceed a specified temperature, for example to avoid performance degradation in case of performing a rejected takeoff (RTO) at any time before V1, so aircraft manufacturers may specify a brake temperature for each given aircraft type above which an aircraft of that type should not takeoff. To ensure that the brakes are cool enough even after use during taxiing out to the runway, it is recommended that an aircraft is not dispatched if its brakes are above a predefined temperature (e.g. 150-200° C., as measured by a brake temperature sensor), which is significantly lower than the maximum permitted take-off temperature and allows for temperature increase during taxi braking. If the brake temperature exceeds this limit when an aircraft is otherwise ready to be dispatched, the aircraft should spend additional time on the ground waiting for the brakes to cool to below the limit. Since the use of brake wear reducing algorithms which de-select brakes (such as the algorithm of US 2004/0065776) result in the selected brakes working harder during a given application, one or more of the brakes of an aircraft using such an algorithm are likely to be hotter after taxiing to the stand than would be the case if the algorithm had not been used. The use of brake wear reducing algorithms which de-select brakes can therefore lead to increased aircraft turn-around time (TAT) in some cases.

An improved system for reducing brake wear is therefore desired.

SUMMARY

A first aspect of the present invention provides an apparatus for reducing brake wear. The apparatus comprises a brake de-selection function for selectively disabling at least one brake on a vehicle, and a controller. The controller is configured to receive torque information which relates to torque reacted by a brake on the vehicle during a braking event, and to receive wheel speed information which relates to a speed of a wheel associated with the brake during the braking event. The controller is further configured to calculate an energy input into the brake during the braking event, based on the received torque information and the received wheel speed information, to determine whether the calculated energy input meets at least one predefined energy input criterion; and to activate the brake de-selection function if the calculated energy input meets the at least one predefined energy input criterion.

Optionally, the vehicle comprises a plurality of brakes and the controller is configured to: receive torque information and wheel speed information in respect of each brake of the plurality and to calculate an energy input into each brake of the plurality during the braking event such that a plurality of calculated energy inputs is generated; select a calculated energy input of the plurality of calculated energy inputs which has the highest value; determine whether the selected calculated energy input meets the least one predefined criterion; and activate the brake de-selection function if the selected calculated energy input meets the at least one predefined criterion.

Optionally, the vehicle comprises a plurality of brakes and the controller is configured to: receive torque information and wheel speed information in respect of each brake of the plurality and to calculate an energy input into each brake of the plurality during the braking event such that a plurality of calculated energy inputs is generated; calculate an average energy input based on the plurality of calculated energy inputs; determine whether the calculated average energy input meets the least one predefined criterion; and activate the brake de-selection function if the calculated average energy input meets the at least one predefined criterion.

Optionally, the at least one predefined energy input criterion comprises an energy input limit defined such that a calculated energy input which exceeds the limit does not meet the at least one predefined energy input criterion. Optionally the energy input limit is set based on a type of the vehicle. Optionally, the vehicle is an aircraft, the braking event occurs during a landing of the aircraft, and the energy input limit is set based on an expected energy input to the brake during taxiing of the aircraft after landing.

Optionally, the controller is configured to determine whether the calculated energy input meets at least one predefined energy input criterion responsive to a predefined taxiing criterion being met, wherein the predefined taxiing criterion comprises one or more of: an aircraft speed threshold defined such that an aircraft speed less than or equal to the threshold meets the predefined taxiing criterion; and a particular flight phase indicated by a flight phase indication system of the aircraft.

Optionally, the controller is configured to receive a braking request. Optionally, the braking request comprises information relating to a requested braking intensity, in which case the controller may be configured to determine, based on the information relating to a requested braking intensity, whether a requested braking intensity meets at least one predefined braking intensity criterion. Optionally, the at least one predefined braking intensity criterion comprises a braking intensity limit defined such that a requested braking intensity which exceeds the braking intensity limit meets the at least one predefined braking intensity criterion, and the controller is configured to activate at least one disabled brake if the requested braking intensity meets the at least one predefined braking intensity criterion. Optionally, the braking intensity limit is an anti-skid braking intensity limit having a value set such that skidding of the vehicle is unlikely to occur at braking intensities below the anti-skid braking intensity limit. Optionally, the braking intensity limit is a structural braking intensity limit having a value set such that excessive loading of a particular aircraft structures is unlikely to occur at braking intensities below the structural braking intensity limit.

Optionally, the brake de-selection function, when active, is configured to: responsive to the controller receiving the braking request, select an operational state of a given brake of the vehicle to be one of: operational and disabled. Optionally the selection is based on total energy input to the given brake during and after the braking event.

Optionally, the vehicle comprises a plurality of brakes; the apparatus comprises a memory accessible by the brake de-selection function, storing information defining at least two brake groups, each defined brake group being a different subset of the plurality of brakes; and the given brake is comprised in a given brake group defined by the stored information. Optionally, the selection is based on total energy input to the given brake and total energy input to each other brake in the given brake group during and after the braking event. Optionally, the brakes in each defined brake group are located on the vehicle such that each defined brake group comprises a symmetrical arrangement of brakes with respect to an intended direction of travel of the vehicle. Optionally, the brake de-selection function is configured to select the same operational state for all of the brakes in a defined brake group.

Optionally, the brake de-selection function is configured to: determine, for each defined brake group, a group energy input value, based on the energy input to each brake in the defined brake group during and after the braking event; and identify a defined brake group having a lowest group energy input value. Optionally the brake de-selection function is configured to select the operational state of the given brake of the vehicle by: selecting the operational state of the given brake to be operational if the given brake is comprised in the identified defined brake group; and selecting the operational state of the given brake to be disabled if the given brake is not comprised in the identified defined brake group.

Optionally, the at least one predefined braking intensity criterion comprises a braking intensity limit defined such that a requested braking intensity which exceeds the braking intensity limit meets the at least one predefined braking intensity criterion, and the controller is configured to activate at least one disabled brake group if the requested braking intensity meets the at least one predefined braking intensity criterion.

Optionally, the brake de-selection function is configured to determine a group energy input value for a given defined brake group by determining the group energy input value to be an average of the energy input into each brake in the given defined brake group during and after the braking event. Optionally, the brake de-selection function is configured to determine a group energy input value for a given defined brake group by determining the group energy input value to be equal to the highest energy input into an individual brake in the given defined brake group during and after the braking event.

Optionally, the vehicle is an aircraft and the braking event occurs during a landing of the aircraft.

The present invention also provides, according to a second aspect, an aircraft comprising: an apparatus according to the first aspect; a torque sensor configured to measure the torque reacted by a brake of the aircraft and to transmit a torque measurement to the apparatus; and a wheel speed sensor configured to measure the speed of a wheel associated with the brake and to transmit a wheel speed measurement to the apparatus.

BRIEF DESCRIPTION OF THE DRAWINGS

Embodiments of the invention will now be described, by way of example only, with reference to the accompanying drawings, in which.

DETAILED DESCRIPTION

The following disclosure relates to systems and processes for reducing the wear of vehicle brakes, e.g. aircraft brakes whilst maintaining the temperature of those brakes below a certain limit. Such systems and processes can thereby extend the life of the vehicle brakes without creating further operational issues, such as extended brake cooling times.

Figure 1:
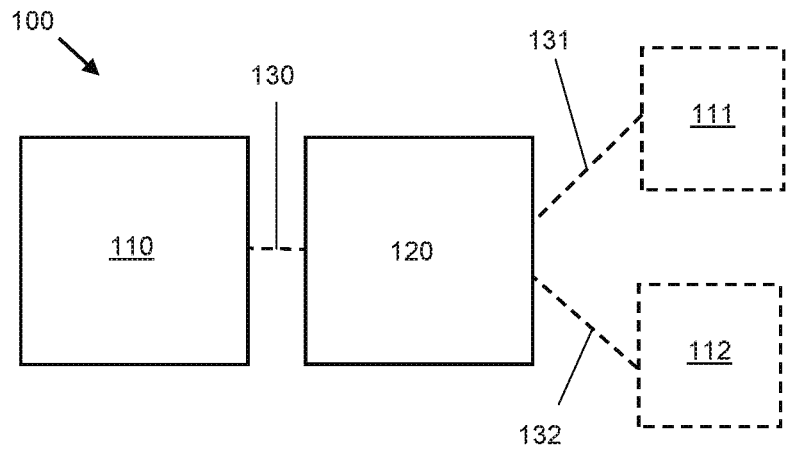
FIG. 1 is a schematic view of an apparatus for reducing brake wear according to an example.

FIG. 1 shows an apparatus 100 for reducing brake wear. The apparatus comprises a brake de-selection function 110 for selectively disabling at least one brake on a vehicle (e.g. a vehicle on which the apparatus is installed); and a controller 120. The brake de-selection function is communicatively coupled to the controller 120 by a communications link 130, which may be wired or wireless. The brake de-selection function 110 and the controller 120 can be comprised in a single device (e.g. an aircraft avionics device). Alternatively the brake de-selection function 110 can be provided remotely from the controller 120. The brake de-selection function 110 may be implemented by a processing unit for receiving and processing data, of any suitable type. The controller 120 can comprise any suitable implementation of a processing unit. The brake de-selection function 110 and the controller 120 may be implemented by the same processing unit.

The controller 120 is configured to receive torque information which relates to torque reacted by a brake on the vehicle during a braking event, e.g. from a torque sensor 111, via a wired or wireless communications link 131. The controller 120 is further configured to receive wheel speed information which relates to a speed of a wheel associated with the brake during the braking event, e.g. from a from a wheel speed sensor 112, via a wired or wireless communications link 132. The controller 120 is further configured to calculate an energy input into the brake during the braking event, based on the received torque information and the received wheel speed information, to determine whether the calculated energy input meets at least one predefined energy input criterion; and to activate the brake de-selection function if the calculated energy input meets at least one predefined energy input criterion.

The vehicle may be any kind of vehicle which comprises one or more braked wheels. However; it is expected that the examples of the disclosure will create particular advantages when implemented on an aircraft, and in particular an aircraft having carbon brakes. Therefore, in the following disclosure the vehicle will be assumed to be an aircraft. However; it should be appreciated that many of the features described could equally be applied to another type of vehicle.

In the context of the current disclosure, the term "braking event" is used to refer to any operation of the brake which causes energy to be input to the brake (and therefore causes the temperature of the brake to increase). In examples in which the vehicle is an aircraft, the braking event may occur during a landing of the aircraft. A braking event which occurs during an aircraft landing may potentially cause the brake to heat up beyond an acceptable take-off temperature for that aircraft. The operation of the brake during the braking event will typically be, e.g., for the purpose of slowing a vehicle on which it is installed. In the current disclosure, the term "braking event" may be used to refer to a single application of the brake, or to multiple consecutive applications of the brake. A braking event which occurs during a landing of the aircraft may comprise all applications of the brake between a time at which the wheel associated with the brake first contacts the ground and a later time at which the wheel speed first drops below a predefined threshold.

The controller 120 can be configured to receive the torque information and/or the wheel speed information in real-time. The controller 120 can be configured to continuously receive torque and/or wheel speed information, or alternatively can periodically receive discrete items of torque information and/or discrete items of wheel speed information. In some examples the controller 120 is configured to request torque information from the torque sensor 111 (e.g. by transmitting a control signal to the torque sensor 111), and to receive the torque information in response to such a request. In some examples the controller 120 is configured to request wheel speed information from the wheel speed sensor 112 (e.g. by transmitting a control signal to the wheel speed sensor 112), and to receive the wheel speed information in response to such a request. In some examples the controller 120 is configured to receive torque information and/or wheel speed information during a selected time period, e.g. a time period during which the aircraft is on the ground, or a time period corresponding to a braking event. In some examples the torque information comprises one or more measured values of a quantity other than torque, e.g. braking force. In such examples, the quantity other than torque may be a quantity from which torque can be derived.

The torque sensor 111 and the wheel speed sensor 112 are not part of the apparatus 100 and are therefore shown using dashed lines in FIG. 1. The torque sensor 111 may comprise any suitable torque sensing device or system. The torque sensor 111 may be configured to measure torque directly, or alternatively may be configured to measure a quantity from which torque can be derived (such as force). For example, the torque sensor 111 can comprise an optical-fibre based sensor (such as a Fibre Bragg Grating (FBG) sensor; a strain gauge, a force sensor, or any other sensor suitable for measuring torque or a quantity from which torque can be derived. On an aircraft where the brake torque is reacted via a torque pin and/or a torque rod (for example, aircraft having a classic bogie arrangement), the torque sensor 111 can comprise an instrumented Torque Pin to sense shear force, located in the interface between a brake lug and a brake torque rod. Alternatively, an optical torque sensor could be used to measure torque in an axle to which the brake is mounted. The wheel speed sensor 112 may comprise any suitable wheel speed sensing device or system. In some examples, the wheel speed sensor 112 comprises or is comprised in a speed measurement system of an aircraft on which the apparatus 100 is installed.

Figure 2:
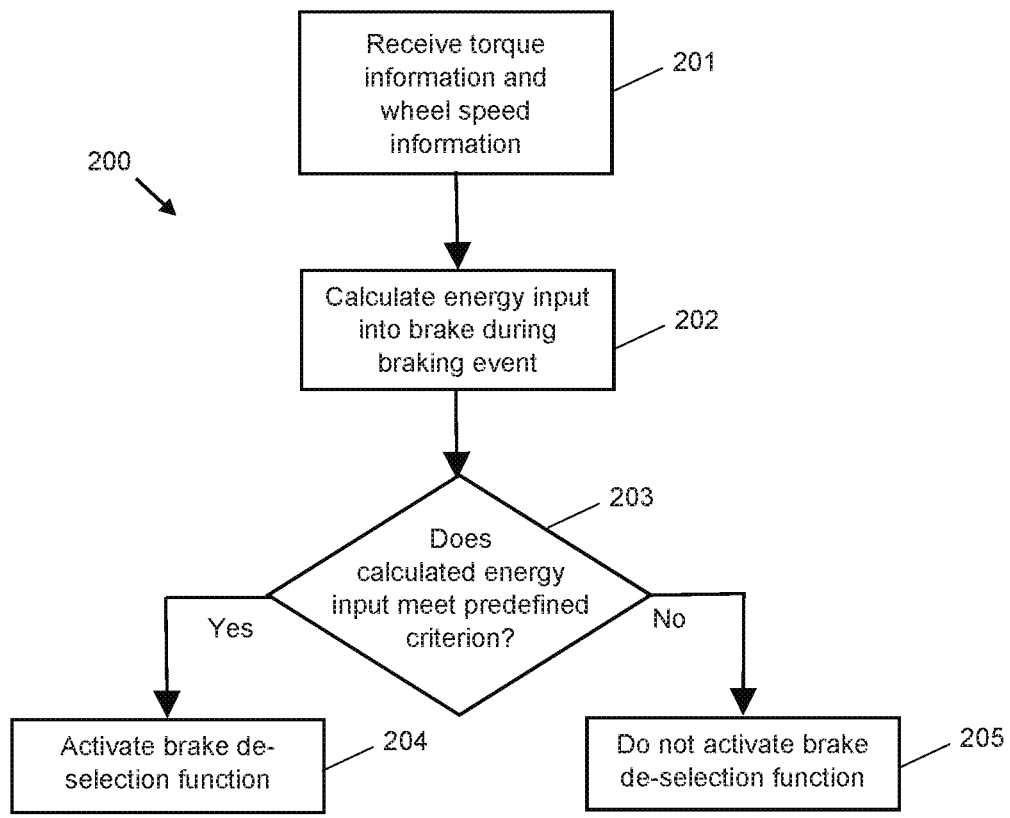
FIG. 2 is a flow chart of an example process for implementation by an example apparatus for reducing brake wear.

The operation of the controller is illustrated by the flow chart of FIG. 2, which represents an example process 200 for determining whether to activate a brake de-selection function (e.g. the brake de-selection function 110) of an apparatus for reducing brake wear (e.g. the apparatus 100). The process 200 may be implementable by the controller 120. In some examples the process blocks of the process 200 may be provided as processor-executable instructions (e.g. executable by a processor of the controller 120) stored on a machine readable storage medium of any suitable type.

In a first process block 201, torque information and wheel speed information is received (e.g. by the controller 120). The torque information may comprise a measured torque value, e.g. of a torque reacted by a brake at a particular instant in time. In some examples the torque information comprises a plurality of measured torque values, e.g., a time-series of measured torque values. In some examples the torque information relates to a selected time period, e.g. a time period corresponding to one or more braking events, or a time period during which an aircraft on which the apparatus 100 is installed is on the ground. In some such examples the torque information comprises a time-series of values for the selected time period. In some examples torque information for a selected time period is received by the controller 120 continuously (either periodically or in real-time) during the time period. Alternatively, torque information for the whole of a selected time period can be received by the controller as a single item of information, e.g. at the end of the selected time period. In some examples the torque information comprises a total value for the torque reacted by the brake during a selected time period.

The torque information can comprise any information from which the torque reacted by the brake can be determined. In a particular example, the torque information comprises a direct measurement of a torque reacted by the brake. Other examples are possible in which the torque information comprises a measurement of a braking force exerted by the brake. Torque reacted by the brake can be derived from such a measurement of braking force by multiplying the measured force by the radius of the moment arm to the centre of the wheel with which the brake is associated. The torque information may therefore include a radius of a wheel with which the brake is associated, or this radius can be stored in a memory accessible to the controller 120. In such examples the controller may be configured to derive a torque value based on a received force value and the process block 201 may comprise deriving a torque based on a received force value.

In some examples the wheel speed information comprises a plurality of measured wheel speed values, e.g., a time-series of measured wheel speed values. In some examples the wheel speed information relates to a selected time period, e.g. a time period during which an aircraft on which the apparatus 100 is installed is on the ground. The selected time period may be the same as a selected time period to which received torque information relates. In some such examples the wheel speed information comprises a time-series of values for the selected time period. In some examples wheel speed information for a selected time period is received continuously (either periodically or in real-time) during the time period. Alternatively, wheel speed information for the whole of a selected time period can be received as a single item of information, e.g. at the end of the selected time period. In some examples the wheel speed information comprises an average of a plurality of measured wheel speed values.

The wheel speed information can comprise any information from which the rotational speed of the wheel can be determined. In a particular example, the wheel speed information comprises a direct measurement of wheel speed in terms of number of revolutions of the wheel per unit time. Other examples are possible in which the wheel speed information comprises a measurement of a frequency of revolution of the wheel. Rotational speed of the wheel can be derived from such a measurement of frequency by multiplying the measured frequency by $2\pi$. In such examples the controller 120 may be configured to derive a wheel speed based on a received frequency value and the process block 201 may comprise deriving a wheel speed based on a received frequency value.

In process block 202, energy input into the brake (that is, the brake in respect of which the torque information and the wheel speed information was received) is calculated (e.g. by the controller 120). The particular manner in which the energy input is calculated in any given example will depend on the nature of the received torque information and wheel speed information in that example. In examples in which the received torque information comprises measured instantaneous torque values, calculating the energy input may comprise calculating a brake power value in respect of each measured torque value, by multiplying the torque value by an angular velocity of the wheel (which may, e.g., be comprised in or determined from the received wheel speed information) at the time the measured torque value was acquired. A total energy input to the brake during the braking event may then be calculated by integrating the brake power values over a time period corresponding to the braking event. Other suitable calculations for deriving a total energy input to the brake may alternatively be used.

In process block 203, it is determined (e.g. by the controller 120) whether the calculated energy input meets at least one predefined energy input criterion. The at least one predefined energy input criterion may comprise an energy input limit defined such that a calculated energy input which exceeds the limit does not meet the at least one predefined energy input criterion (for example, if the predefined energy input criterion comprises an upper threshold for energy input). Such an energy input limit may be set, for example, at a level appropriate for ensuring (at least a high probability) that a total energy input into the brake during the braking event and a period immediately following the braking event during which the brake de-selection function is active (e.g. a taxiing period) is below a certain predetermined threshold. Such an energy input limit may be set, for example, at a level appropriate for ensuring that a temperature of the brake at the end of a period immediately following the braking event during which the brake de-selection function is active is below a certain predetermined threshold. That is, the entry condition for the brake deselection function may be set to as to achieve a desired brake condition (in terms of energy and/or or temperature) at the end of the ensuing period of operation of the brake deselection function.

If a flight is very short, it is possible that one or more brakes may not have fully cooled following a preceding ground cycle by the time the aircraft is ready to land again. That is, one or more brakes may still contain residual energy input by the preceding ground cycle at the time at which the determination of block 203 is performed. Therefore, in some examples the predefined energy input criterion is defined so as to account for any residual energy contained in the brake. For example, the predefined energy input criterion may be defined such that the sum of the calculated energy input and the residual energy contained in the brake must be less than a certain predetermined threshold in order for the criterion to be met. In such examples the controller is configured to determine an amount of residual energy in the brake before determining whether the calculated energy input meets at least one predefined energy input criterion. Determining an amount of residual energy in the brake may be based on data relating to the current temperature of the brake (i.e. at the time of performing the determination), or based on flight duration and an estimated cooling time of the brake. Determining an amount of residual energy in the brake may be performed simultaneously with other pre-landing checks performed by the aircraft. In some examples performing the determination of an amount of residual energy may be triggered by extension of the landing gear or another pre-landing event.

In a particular example in which the vehicle is an aircraft and the braking event occurs during a landing of the aircraft, the energy input limit may be set based on an expected energy input to the brake during taxiing of the aircraft after landing with the brake de-selection function activated. It will be appreciated that the amount of energy input to the brake during any particular taxiing session will vary depending on taxiing route and duration, traffic, and the like. However; it is possible to define a conservative worst-case value for the expected taxiing energy input (with the brake de-selection function activated), which may be, for example, at least double the value of an average taxiing energy input (with the brake de-selection function activated).

It is possible to calculate, for a given brake, the temperature increase that will result from a given energy input into that brake (e.g. using any suitable known technique). The relationship between energy input and temperature increase is specific to a particular brake and depends on the mass of the brake and on the thermal properties of the brake material. The mass of an aircraft brake will vary over the brake lifetime due to some of the friction material being worn away. However; whilst a less massive brake will experience a greater temperature increase for a given energy input, it will also cool faster, meaning that over a whole ground cycle (which for the purposes of this disclosure is considered to be the time period between touch-down and pushback for the next take-off), the effects of brake wear on final brake temperature should be small. This is illustrated by FIG. 3, which shows the total energy input and the brake temperature of a new (that is, not significantly worn) aircraft brake 310 and the brake temperature of a worn aircraft brake 320 over a complete ground cycle and subsequent takeoff.

Figure 3:
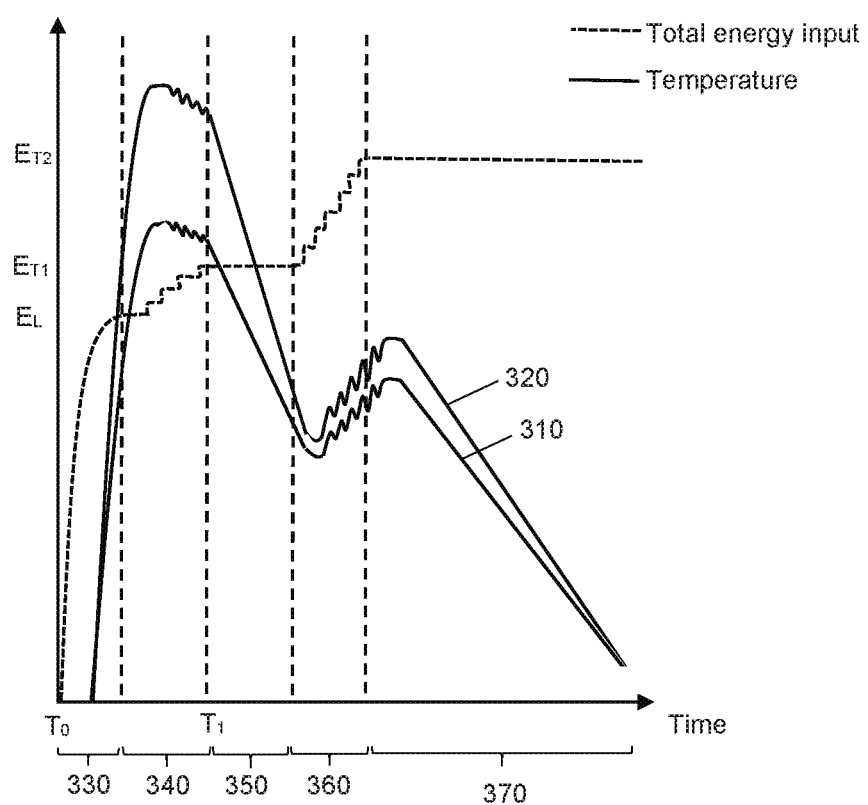
FIG. 3 is a graph of total energy input to an example brake and temperature of the example brake against time.

The graph of FIG. 3 starts at a time $T_0$, corresponding to a time at which the brakes are first applied on touch-down of the aircraft wheels. The braking event corresponding to the landing occurs during the time period 330. The landing is followed by a first period of taxiing 340 (called taxi-in), during which the brakes are applied several times. The taxiing period 340 is followed by a period 350 during which the aircraft is on the stand (corresponding to the parking time). Then there is a second taxiing period 360 (called taxi-out) in which the aircraft is taxiing from the stand to the runway, during which the brakes are applied several times again. A predefined acceptable temperature for aircraft pushback may take into account further temperature increases expected as a result of taxiing from the stand to the runway. The final time period 370 represents the takeoff and a period of subsequent flight. A total amount of energy $E_L$ is input to the brakes during the landing (for simplicity, it is assumed that the same energy is input into the new brake and the worn brake during each brake application). A further amount of energy is then input during the brake applications associated with the first taxiing period 340, increasing the total energy input to $E_{T1}$. Yet more energy is input during the brake applications associated with the second taxiing period 360, increasing the total energy input to $E_{T2}$. It can be seen that, shortly after an amount of energy is input to the brakes, the temperature of each brake rises by an amount proportional to the amount of energy input (that is, the relatively large energy input during the landing period 330 creates a relatively large temperature increase, whilst the relatively small energy inputs during the taxiing periods 340 and 360 create relatively small temperature increases).

During the times when no energy is being input to the brakes, the temperature of each brake decreases at a rate dependent on the maximum temperature, environmental conditions, the specific heat capacity of the brake and the mass of the brake. FIG. 3 illustrates that the worn brake 320 becomes hotter as a result of a given energy input than the new brake 310, but that it also cools faster. Consequently, both brakes reach ambient temperature at a similar time. However, it should be appreciated that in practice brake cooling rates are affected by many external factors such as ambient temperature, airflow, and the like, which may affect different brakes to differing degrees. As such, it is possible for a worn brake to reach ambient temperature before or after a new brake. The above description represents an idealised scenario in which such external factors are not present or affect all brakes equally.

It is possible to calculate an expected temperature increase corresponding to an expected taxiing energy input with the brake de-selection function activated. In some examples an energy input limit comprised in the predefined energy input criterion may be determined by subtracting an expected temperature increase during taxiing (with the brake de-selection function activated) from a maximum acceptable temperature at the end of a ground cycle, just before takeoff. The resulting temperature value will correspond to a maximum acceptable temperature increase associated with the braking event. A maximum energy input for the braking event can be calculated from this maximum acceptable temperature increase. In some examples the energy input limit may be set to be equal to such a maximum energy input for the braking event.

Setting an energy input limit in this manner has the effect of discriminating between braking events for which subsequent taxiing (with the brake de-selection function activated) will not cause the temperature of the brake at the end of the ground cycle to exceed a maximum acceptable temperature, from braking events for which subsequent taxiing might or will cause the temperature of the brake at the end of the ground cycle to exceed a maximum acceptable temperature. The degree of certainty that any given braking event having an energy input below the energy input limit will not cause the temperature of the brake at the end of the ground cycle to exceed the maximum acceptable temperature will be dependent on the level at which the energy input limit is set—a lower limit will increase the certainty and vice versa. In some examples, therefore, the energy input limit may be set to achieve a particular degree of certainty that any given braking event having an energy input below the energy input limit will not cause the temperature of the brake at the end of the ground cycle to exceed the maximum acceptable temperature. In some examples the energy input limit may be set to achieve a particular probability that any given braking event having an energy input below the energy input limit will not cause the temperature of the brake at the end of the ground cycle to exceed the maximum acceptable temperature.

The predefined energy input criterion may be set, for example, based on a type of the vehicle. The at least one predefined energy input criterion may be defined in respect of a particular class of vehicles, in which the subject vehicle is comprised. A class of vehicles may be defined based on one or more of: vehicle type, vehicle model and/or manufacturer, vehicle size, number of wheels, brake type, etc. For example, a given predefined energy input criterion may be defined in respect of all aircraft of a given model from a given manufacturer, made by a particular manufacturer (e.g. all Airbus A380 aircraft). The at least one predefined energy input criterion may be defined based on measurements of the thermal behaviour of brakes of vehicles belonging to a certain predefined class. The at least one predefined energy input criterion may be defined based on information relating to the wear behaviour of the brakes of the vehicle. The at least one predefined energy input criterion may be defined based on an estimate of the energy typically input to the brakes of the vehicle during an operational period of a brake wear reduction function.

Returning to FIG. 2, in some examples performing block 203 comprises comparing the calculated energy input to the predefined energy input criterion. For example, in examples in which the predefined energy input criterion comprises an energy input limit, performing block 203 may comprise determining whether the calculated energy input is greater than, less than, or equal to the energy input limit.

Performing block 203 may comprise generating one of: a determination that the calculated energy input meets the at least one predefined energy input criterion, and a determination that the calculated energy input does not meet the at least one predefined energy input criterion.

If in block 203 it is determined that the calculated energy input meets the at least one predefined energy input criterion, then in process block 204 the brake de-selection function (e.g. the brake de-selection function 110) is activated (e.g. by the controller 120). Activating the brake de-selection function may comprise, for example, sending a control signal (of any suitable form) to the brake deselection function. In some examples activating the brake de-selection function may comprise activating an indicator and/or generating a notification in the cockpit of the vehicle, e.g. to alert a pilot or other controller of the vehicle that the brake de-selection function has been activated.

If in block 203 it is determined that the calculated energy input does not meet the at least one predefined energy input criterion, then in process block 205 the brake de-selection function is not activated. Performing block 205 may merely comprise the controller 120 not taking any action to activate the brake de-selection function. Alternatively, performing block 205 may comprise de-activating or disabling the brake de-selection function, e.g. by the controller 120 sending an appropriate control signal to the brake de-selection function. In some examples, not activating the brake de-selection function may comprise activating an indicator and/or generating a notification in the cockpit of the vehicle, to alert a pilot or other controller of the vehicle that the brake de-selection function is not active.

The controller 120 may be configured to initiate the process 200 in response to a predefined taxiing criterion being met. For example, the controller 120 may be configured to initiate the process 200 as soon as the aircraft enters a taxiing period. A taxiing period may be defined in relation to the speed of the aircraft, in which case the predefined criterion may comprise an aircraft speed threshold defined such that a speed of the aircraft which is less than or equal to the speed threshold meets the predefined taxiing criterion. In some examples a value of the aircraft speed threshold is 30 knots. An aircraft speed may be continuously determined by the controller 120 (or by another aircraft system, which then sends current aircraft speed data to the controller 120), for example based on the received wheel speed information. In some examples the current aircraft speed is determined based on an average wheel speed of all wheels of the aircraft. Alternatively or additionally, a taxiing period may be defined to correspond to a flight phase as indicated by a flight phase indication system of the aircraft (e.g. a Flight Warning System (FWS)), such that the process 200 is initiated when the flight phase indication system indicates that the aircraft is in a particular flight phase (e.g. taxi-in).

In some examples the vehicle comprises a plurality of brakes, each of which may be associated with a different wheel of the vehicle. In some such examples the controller 120 is configured to receive torque information and wheel speed information in respect of each brake of the plurality, and to calculate an energy input into each brake of the plurality during the braking event. The controller 120 therefore generates a plurality of calculated energy inputs. In some examples the controller is configured to select a calculated energy input of this plurality of calculated energy inputs which has the highest value, and to determine whether the selected calculated energy input meets the least one predefined criterion (e.g. in the manner described above in relation to block 203 of FIG. 2). The controller 120 may be configured to activate the brake de-selection function 110 if the selected calculated energy input meets the at least one predefined criterion. By selecting the highest value calculated energy input as the basis for whether or not to activate the brake de-selection function 110, it can be ensured that none of the brakes will receive an excessive amount of energy (i.e. an amount of energy which could lead to one or more of the brakes exceeding a maximum acceptable temperature at the end of a ground cycle, and consequently requiring additional cooling time) if the brake de-selection function 110 is then activated.

In some alternative examples in which the vehicle comprises a plurality of brakes, the controller 120 is configured to calculate an average energy input based on the plurality of calculated energy inputs and to determine whether the calculated average energy input meets the least one predefined criterion (e.g. in the manner described above). That is, the calculated average energy input is used as the basis for whether or not to activate the brake de-selection function 110.

The brake de-selection function 110 aims to extend the life of the or each brake on the vehicle by decreasing the number of brake applications during each ground cycle. As discussed above, brake wear for carbon brakes has been found to correlate significantly with the number of brake applications and to be much less affected by the energy absorbed during each brake application. Most brake applications occur during ordinary taxiing, so the brake de-selection function 110 disables or otherwise de-selects some of the brakes for each brake application, such that only a subset of the brakes on a vehicle are applied for each brake application whilst the brake de-selection function 110 is active. Moreover, the brake deselection function 110 may be configured to select which brake or brakes are selected for each brake application in a manner suitable for avoiding the overheating of any individual brake. When active, the brake de-selection function 110 is configured to operate as follows.

In some examples the brake de-selection function 110 is configured to, responsive to the controller 120 receiving the braking request, select an operational state of a given brake of the vehicle to be one of: operational and disabled. The selection may be based, for example, on total energy input to the given brake during and after the braking event. Where the vehicle is an aircraft, for example, the total energy input during and after the braking event will include the energy input during landing and any energy input during subsequent taxiing, up until the time at which the brake de-selection function 110 is performing the selection.

The brake de-selection function 110 may be configured to receive torque measurements and wheel speed measurements from the torque sensor 111 and the wheel speed sensor 112, either directly or via the controller 120, in any suitable manner. Such measurements may be received by the brake de-selection function in respect of each braked wheel of the vehicle. The brake de-selection function 110 may thereby calculate a total energy that has been input into each brake of the vehicle, e.g. in the manner described above in relation of the operation of the controller 120. The brake de-selection function 110 may be configured to continuously or periodically update this calculation during the time that the brake de-selection function 110 is operational, such that at any given time the brake de-selection function 110 has a current value for the total energy input into each brake.

The advantageous effect of the brake de-selection function 110 is achieved for vehicles comprising a plurality of brakes, as will be appreciated from the above discussions. For any vehicle comprising a plurality of brakes, it is possible to define different groupings of those brakes. The more brakes a vehicle has, the more different groupings are possible. In some examples, the apparatus 100 comprises a memory accessible by the brake de-selection function 110, storing information defining at least two brake groups. Each defined brake group is a different subset of the plurality of brakes. A defined brake group may comprise a single brake. A defined brake group may comprise all of the brakes of the vehicle. For a vehicle having N brakes, a defined brake group may comprise any number of brakes between 1 and N.

In some examples each given brake may be comprised in only one of the defined brake groups.

In some examples the brakes in each defined brake group are located on the vehicle such that each defined brake group comprises a symmetrical arrangement of brakes with respect to an intended direction of travel of the vehicle. Advantageously, defining each brake group to comprise a symmetrical arrangement of brakes means that applying only that group of brakes will not create forces that cause the vehicle to yaw or otherwise deviate laterally from a desired course. FIGS. 4a-d illustrate example symmetrical brake groupings which may be defined for vehicles having various different wheel arrangements.

Figure 4A:
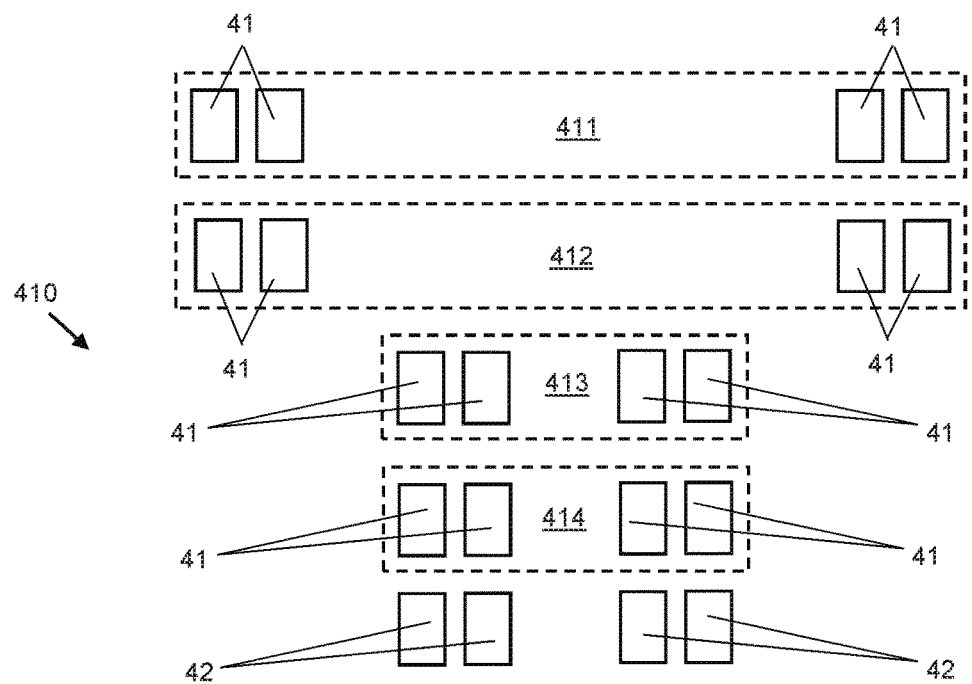
FIGS. 4a-d are block diagrams showing example brake groupings for use by an apparatus for reducing brake wear.

FIG. 4a shows a vehicle wheel arrangement comprising eight pairs of braked wheels 41 and two pairs of unbraked wheels 42. This wheel arrangement may, for example, be comprised in a large airliner such as an Airbus A380. In the illustrated example, four symmetrical brake groups 411, 412, 413 and 414 are defined, each of which comprises four braked wheels 41. Each braked wheel 41 is comprised in one of the defined brake groups 411-414. The unbraked wheels 42 are not comprised in any of the defined brake groups.

Figures 4B, 4C:
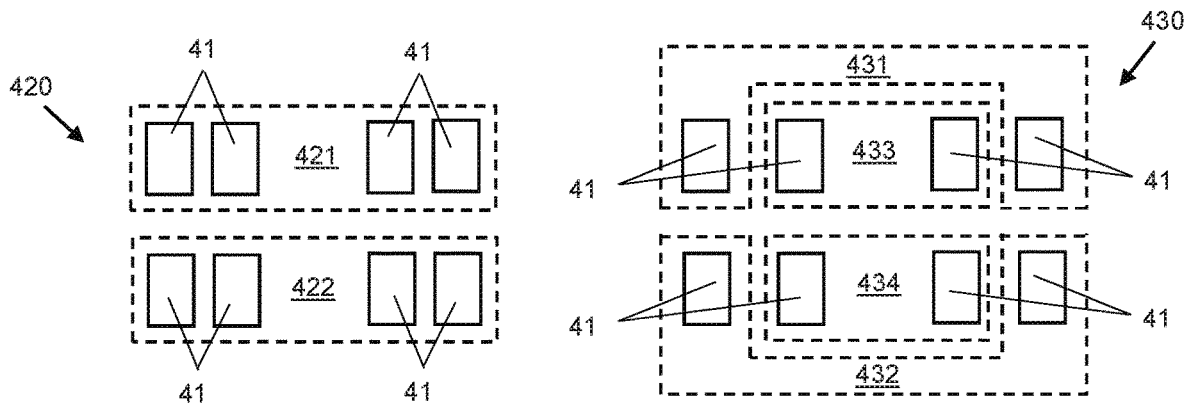

FIGS. 4b and 4c both show a vehicle wheel arrangement comprising four pairs of braked wheels 41. This wheel arrangement may, for example, be comprised in a medium-sized airliner such as an Airbus A330. In the example of FIG. 4b, two symmetrical brake groups 421, 422 are defined, each of which comprises a different four of the eight braked wheels 41. All of the braked wheels located at the same position on an axis parallel to the direction of travel of the vehicle are comprised in the same brake group. The defined brake groups therefore comprise a forward brake group 422 and a rearward brake group 421.

In the example of FIG. 4c, four symmetrical brake groups 431, 432, 433, 434 are defined, each of which comprises a different two of the eight braked wheels 41. Each of the braked wheels comprised in a given brake group are located at the same position on an axis parallel to the direction of travel of the vehicle. The two braked wheels comprised in a given brake group are located the same distance away from a central axis of the vehicle which is parallel to the direction of travel, on opposite sides of the vehicle. The defined brake groups therefore comprise a forward outer brake group 432, a forward inner brake group 434, a rearward outer brake group 431, and a rearward inner brake group 433.

Figure 4D:
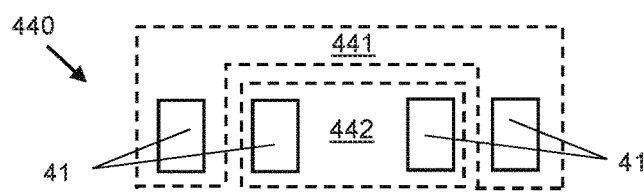

FIG. 4d shows a vehicle wheel arrangement comprising two pairs of braked wheels 41. This wheel arrangement may, for example, be comprised in a small airliner such as an Airbus A320. In the illustrated example, two symmetrical brake groups 441 and 442 are defined, each of which comprises two braked wheels 41. The two braked wheels comprised in a given brake group are located the same distance away from a central axis of the vehicle which is parallel to the direction of travel, on opposite sides of the vehicle. The defined brake groups therefore comprise an outer brake group 441 and an inner brake group 442.

In examples in which the apparatus 100 comprises a memory storing information defining at least two brake groups, the given brake for which the brake de-selection function 110 selects an operational state is comprised in a given brake group defined by the stored information. In some such examples the selection (i.e. of the operational state) is based on total energy input to the given brake and total energy input to each other brake in the given brake group during and after the braking event. The brake de-selection function 110 may be configured to select the same operational state for all of the brakes in a defined brake group. For example, the brake de-selection function may be configured to identify a brake in the given brake group which has the highest total energy input and to select the operational state of the given brake based on the energy input to the identified brake. The brake de-selection function may be configured to select the operation state of each brake in the given brake group based on the energy input to the identified brake. Alternatively, the brake de-selection function may be configured to calculate an average total energy input of the total energy inputs associated with all brakes in the group, and to select the operational state of the given brake based on the calculated average total energy input. The brake de-selection function may be configured to select the operation state of each brake in the given brake group based on the calculated average total energy input.

In some examples the brake de-selection function 110 is configured to determine, for each defined brake group, a group energy input value. The group energy input value may be determined based on the energy input to each brake in the defined brake group during and after the braking event. The brake de-selection function may further be configured to identify a defined brake group having a lowest group energy input value. In some such examples the brake de-selection function 110 may be configured to select the operational state of the given brake of the vehicle by selecting the operational state of the given brake to be operational (or selected) if the given brake is comprised in the identified defined brake group; and selecting the operational state of the given brake to be disabled (or de-selected) if the given brake is not comprised in the identified defined brake group.

The brake de-selection function 110 may, for example, be configured to determine a group energy input value for a given defined brake group by determining the group energy input value to be an average of the energy input into each brake in the given defined brake group during and after the braking event. Alternatively the brake de-selection function 110 may be configured to determine a group energy input value for a given defined brake group by determining the group energy input value to be equal to the highest energy input into an individual brake in the given defined brake group during and after the braking event.

Thus, the brake de-selection function 110 may operate to select, in respect of each received braking request, the braking group for which the total energy input so far during the ground cycle is lowest. This ensures that, at the end of a ground cycle, the amount of energy input into each brake of the vehicle is equalized as far as possible, reducing the risk of any of the brakes receiving a disproportionately high energy input. As a result, the risk of any of the brakes having an unacceptably high temperature at the end of a ground cycle may be significantly reduced. Furthermore, selecting the operational state of a brake or brake group for a given brake application based on total energy input can provide a more effective means of avoiding high brake temperatures at the end of a ground cycle than selecting based on brake temperature. This is because most current brake temperature measurement systems experience a significant thermal lag, such that current readings do not reflect current brake temperatures, and also because brake temperatures during a ground cycle will be affected by brake wear, as illustrated by FIG. 3. Thus, it is possible that a brake which has received the most energy input so far during the ground cycle may not have the highest temperature at a particular time, if there exist significant differences between the wear levels of the brakes on a vehicle.

The operation of the controller 120 following activation of the brake de-selection function 110 (i.e. during any period in which the brake de-selection function 110 is active) will now be explained.

The controller 120 may be configured to receive a braking request, e.g. from a braking control system of the vehicle. The braking request may be received in the form of an electrical signal, via a communications link between the controller 120 and a braking control system of the vehicle. The braking request may be generated, for example, when an operator of the vehicle (e.g. an aircraft pilot) activates a control to initiate braking. For example, a braking request may be generated when a pilot presses a brake pedal. The control may be configured such that the operator can vary the intensity of the braking being requested. In examples in which the control comprises a brake pedal, for example, the requested braking intensity may correlate with the amount of pressure applied by the operator to the brake pedal. The braking request may therefore comprise information relating to a requested braking intensity. The braking request may alternatively comprise information from which a requested braking intensity is derivable, in which case the controller 120 may be configured to derive a requested braking intensity based on the received braking request.

For the purposes of this disclosure, "braking intensity" is used to refer to an overall amount of braking to be achieved (i.e. in response to a braking request). It will be appreciated that this may not correlate with the "intensity" (i.e. forcefulness) with which any given brake of the vehicle is applied to achieve the braking. For example, a braking request having an associated requested braking intensity can be considered to be requesting a particular amount of braking, and in a multi-brake vehicle, that requested amount of braking can potentially be achieved by applying one of the brakes very forcefully, or by applying all of the brakes much less forcefully. How much braking intensity is being requested by a vehicle operator can be determined by a brake control system of the vehicle in any suitable manner, and can be encoded into a braking request (i.e. a braking request sent to the apparatus 100) in any suitable manner.

In some examples a vehicle may be configured such that a braking request comprises a continuous signal over a period of time, which may be a time period during which braking is to be performed. For example, a vehicle operator may maintain a brake pedal in a depressed state for the whole time period during which they wish the brakes to be applied. During the time period, the intensity of the braking being requested may vary, as indicated by the operator varying the pressure being applied to a brake pedal. The braking request may therefore comprise a time-varying signal.

In some examples, responsive to receiving a braking request, the controller is configured to determine whether a requested braking intensity meets at least one predefined braking intensity criterion. The determination may be performed based on the information relating to a requested braking intensity that is comprised in the received braking request. In some examples the at least one predefined braking intensity criterion comprises a braking intensity limit defined such that a requested braking intensity which exceeds the braking intensity limit meets the at least one predefined braking intensity criterion. In one such example the at least one predefined braking intensity criterion may comprise a lower threshold for braking intensity. In such examples the at least one predefined braking intensity criterion may be considered a criterion for identifying requested braking intensities which are too high to be achieved using just one brake or brake group, and therefore too high for the brake wear reduction function to be permitted to operate normally. A braking intensity limit may comprise one or more of: a maximum braking intensity limit defined such that a requested braking intensity which exceeds the maximum braking intensity limit meets the at least one predefined braking intensity criterion (the "maximum" referring to a maximum braking intensity at which the brake wear reduction function is permitted to function normally), and an intermediate braking intensity limit higher than the maximum braking intensity limit, defined such that a requested braking intensity which exceeds the intermediate braking intensity limit meets the at least one predefined braking intensity criterion. An intermediate braking intensity may be, for example, an anti-skid braking intensity limit, or a braking intensity limit set so as to avoid excessive loading (e.g. excessive asymmetrical loading) of the landing gear or other aircraft structures. A maximum braking intensity limit and an intermediate braking intensity limit will be discussed in more detail below.

The predefined braking intensity criterion may be set, for example, based on a type of the vehicle. The at least one predefined braking intensity criterion may be defined in respect of a particular class of vehicles, in which the subject vehicle is comprised. A class of vehicles may be defined as discussed above in relation to the predefined energy input criterion. The at least one predefined braking intensity criterion may be defined based on measurements of the properties and/or behaviour of brakes of vehicles belonging to a certain predefined class.

In some examples the controller 120 is configured to determine whether a requested braking intensity meets the predefined braking intensity criterion by comparing a requested braking intensity to the predefined braking intensity criterion. For example, in examples in which the predefined braking intensity criterion comprises a braking intensity limit, the controller 120 may be configured to determine whether the requested braking intensity is greater than, less than, or equal to the braking intensity limit. The controller 120 may be configured to generate one of: a determination that the braking intensity limit meets the at least one predefined braking intensity criterion, and a determination that the requested braking intensity does not meet the at least one predefined braking intensity criterion.

In some examples, responsive to a determination that the requested braking intensity does not meet the at least one predefined braking intensity criterion, the controller 120 may be configured to operate brakes of the vehicle in accordance with the brake de-selection function 110. That is, if the brake de-selection function has selected certain of the brakes (i.e. selected brakes) to operate in response to the braking request and certain other of the brakes (i.e. de-selected brakes) not to operate in response to the braking request, then the controller 120 will cause the selected brakes to be applied and will not cause the de-selected brakes to be applied (or will otherwise prevent the de-selected brakes from being applied). In some examples, the controller may be configured to, responsive to a determination that the requested braking intensity meets the at least one predefined braking intensity criterion, modify the effect of the brake de-selection function 110. Modifying the effect of the brake de-selection function 110 may, for example, comprise disabling or otherwise overriding the brake de-selection function in respect of the particular received braking request. Modifying the effect of the brake de-selection function 110 may comprise activating at least one of the brakes de-selected by the brake de-selection function 110, in respect of the particular received braking request.

Activating at least one of the de-selected brakes may comprise identifying a de-selected brake having a lowest total energy input; and activating the identified brake. A de-selected brake having the lowest total energy input can be identified, for example, by determining a value of the total energy input for each of the de-selected brakes and comparing these determined values. In some examples the de-selected brakes may be ordered according to total energy input. In some examples, activating at least one of the de-selected brakes may comprise activating a de-selected brake group. In such examples activating at least one of the de-selected brakes may comprise identifying a de-selected brake group having a lowest total energy input; and activating the identified brake group. Identifying a de-selected brake group having a lowest total energy input may comprise determining a group total energy input value, e.g. in the manner described above, for each de-selected brake group and comparing these group total energy input values. In some examples the de-selected brake groups may be ordered according to group total energy input values. The total energy inputs determined for the purpose of activating at least one of the de-selected brakes may include energy input during the braking event and any subsequent energy input, e.g. as a result of operation of one or more of the de-selected brakes in a time period between the braking event and the current time (that is, the time of performing the identification of a de-selected brake or brake group having a lowest total energy input).

Figure 5:
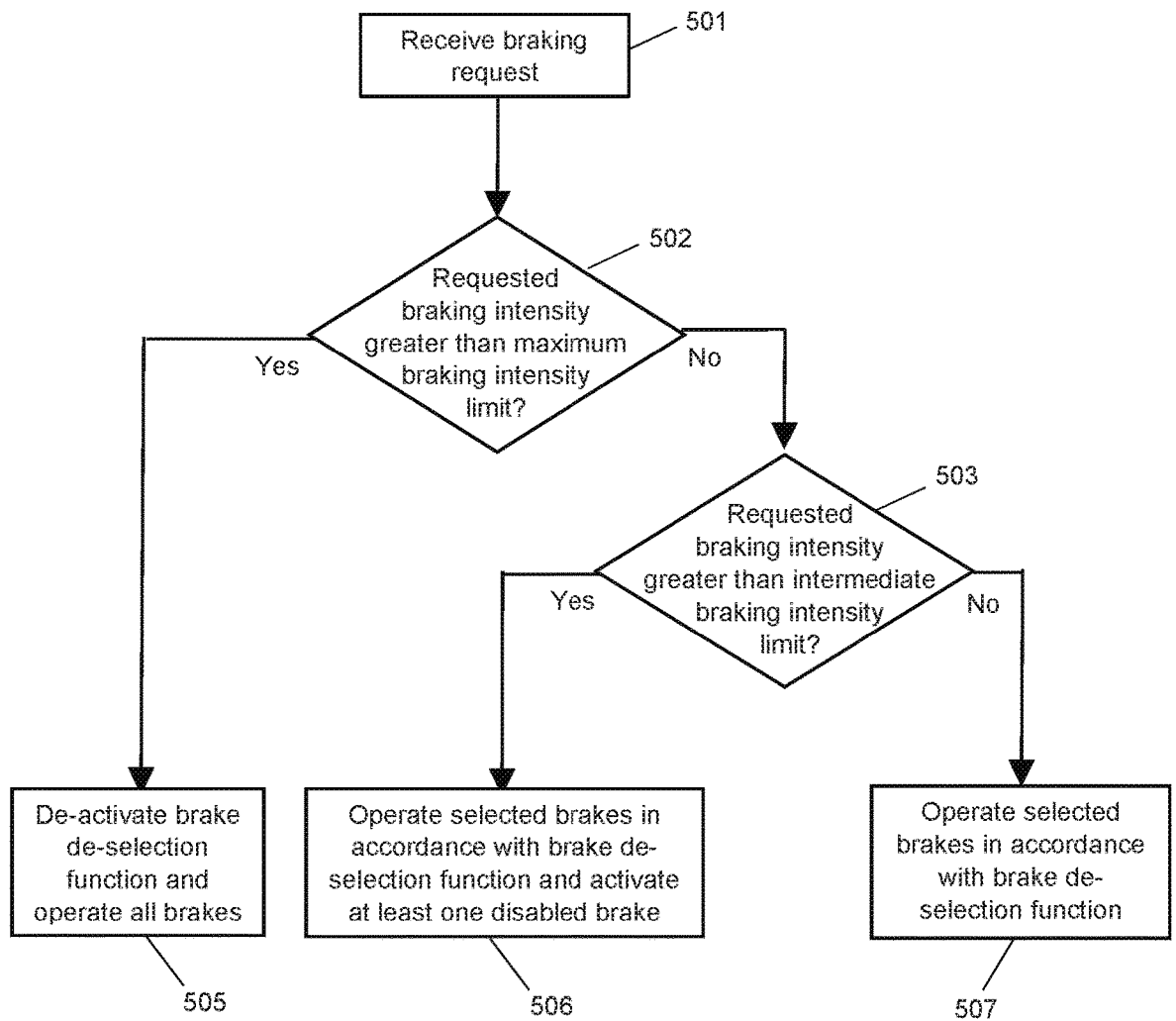
FIG. 5 is a flow chart of an example process for implementation by an apparatus for reducing brake wear.

FIG. 5 is a flow chart which illustrates a particular example process 500 for implementation by an apparatus for reducing brake wear (e.g. the apparatus 100) when a brake de-selection function (e.g. the brake de-selection function 110) of that apparatus is active. The process 500 may be implementable by the controller 120. In some examples the process blocks of the process 500 may be provided as processor-executable instructions (e.g. executable by a processor of the controller 120) stored on a machine readable storage medium of any suitable type.

In a first process block 501 a braking request is received, e.g. by the controller 120. The braking request may have any of the features described above in relation to the operation of the controller 120. Then, in process block 502 it is determined (e.g. by the controller 120) whether a requested braking intensity is greater than a maximum braking intensity limit. The maximum braking intensity limit may be comprised in a predefined braking intensity criterion. The maximum braking intensity limit may be set at a relatively high level. The maximum braking intensity limit may be set based on details of the operation of the brake de-selection function, such as a number of brakes that the brake de-selection function is configured to select for each given brake application. The maximum braking intensity limit may be set based on a maximum braking intensity achievable using a number of brakes that the brake de-selection function is configured to select for each given brake application. The determination may be based on information relating to a requested braking intensity that is comprised in the braking request. The determination may be performed in any of the manners described above in relation to the operation of the controller 120.

If it is determined in block 502 that the requested braking intensity is greater than the maximum braking intensity limit, then the process moves to block 505. In block 505 the brake de-selection function 110 is (temporarily) overridden, disabled or otherwise de-activated by the controller 120, such that all brakes on the vehicle are activated in response to the received braking request. The de-activation of the brake de-selection function 110 may be performed only in respect of the particular braking request, such that the brake de-selection function will return to being operational in respect of a subsequent braking request. Performing block 505 may comprise the controller 120 activating all brakes of the vehicle, e.g. by sending a control signal to each brake of the vehicle.

If it is determined in block 502 that the requested braking intensity is not greater than the maximum braking intensity limit (i.e. the requested braking intensity is less than or equal to the maximum braking intensity limit), then the process moves to block 503. In block 503 it is determined (e.g. by the controller 120) whether a requested braking intensity is greater than an intermediate braking intensity limit. The intermediate braking intensity limit may be comprised in a predefined braking intensity criterion. The intermediate braking intensity limit may be set at a relatively high level (i.e. as compared to the level of a maximum braking intensity limit). The intermediate braking intensity limit may be set based on details of the operation of the brake de-selection function, such as a number of brakes that the brake de-selection function is configured to select for each given brake application. The intermediate braking intensity limit may be, for example, an anti-skid braking intensity limit, or a limit set so as to prevent excessive load being experienced by an aircraft structure (e.g. the landing gear). In examples in which the brake is hydraulically actuated, such an anti-skid braking intensity limit may be set to correspond to an emergency brake pressure limit defined for the vehicle. In examples in which the brake is electrically actuated, such an anti-skid braking intensity limit may be set to correspond to an emergency brake clamping force defined for the vehicle. Such an emergency brake pressure limit may comprise a theoretical applied brake pressure (that is, a pressure of the brake fluid) below which skidding of the vehicle is unlikely to occur. The determination may be based on information relating to a requested braking intensity that is comprised in the braking request. The determination may be performed in any of the manners described above in relation to the operation of the controller 120.

If it is determined in block 503 that the requested braking intensity is greater than the intermediate braking intensity limit, then the process moves to block 506. In block 506, the controller activates at least one brake or brake group that has been de-selected by the brake de-selection function, in the manner described above in relation to the operation of the controller 120. The controller may be configured to activate a plurality of brakes or brake groups that have been de-selected by the brake de-selection function. In some examples, a number of de-selected brakes/brake groups to activate is determined based on a level of the requested braking intensity, as will be discussed in further detail below with reference to FIGS. 6(*a*) to 6(*e*).

If it is determined in block 503 that the requested braking intensity is not greater than the intermediate braking intensity limit (i.e. the requested braking intensity is less than or equal to the intermediate braking intensity limit), then the operation of the brake de-selection function 110 is not modified by the controller 120 (block 507). That is, the brakes selected by the brake de-selection function 110 are applied, and the de-selected brakes are not applied.

As discussed above, in some examples the braking request may comprise a time-varying signal, for which the requested braking intensity varies with time. In such examples the process of FIG. 5 may be performed in real-time during a time period in which the braking request signal is being received. In such examples the process of FIG. 5 may be performed continuously (e.g. using a series of instantaneous values of the requested braking intensity), or at predefined intervals. It is therefore possible that, for a given brake application resulting from a given braking request, the operation of the brake de-selection function 110 may be modified during a first part of the brake application and not modified during a second part of the brake application.

FIGS. 6(a) to 6(e) illustrate in more detail various possible ways in which the controller 120 may modify the operation of the brake de-selection function 110. The example illustrated in FIGS. 6(a) to 6(e) relate to a vehicle having four brake groups 611-614, but can equally be extended to more or fewer brake groups. The brakes in this particular example are hydraulically actuated, such that the pressure of the brake fluid of a given brake during a given application of that brake correlates with how forcefully that brake is being applied (that is, how much braking force is being exerted by the brake). However; the same principles can be applied to electrically actuated brakes, in which case brake clamping force can be used in place of brake fluid pressure. The brake groups are configured such that the same braking pressure is used for all brakes in the same group.

Figure 6A:
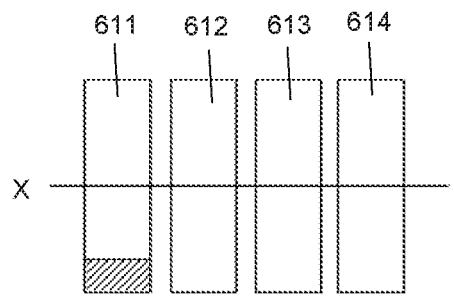
FIGS. 6(a) to 6(e) are a set of block diagrams illustrating example braking pressures for example brake groups.
Figure 6B:
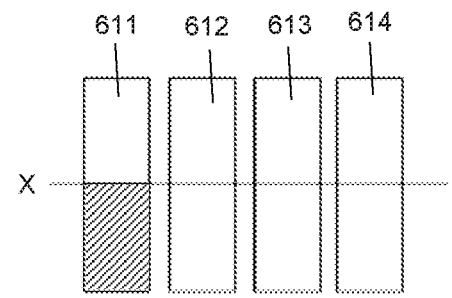
Figure 6C:
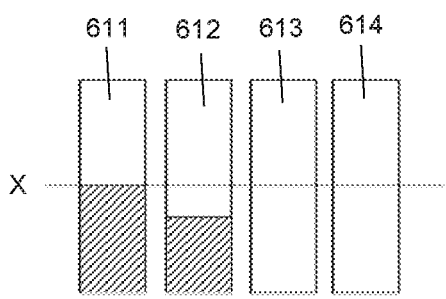
Figure 6D:
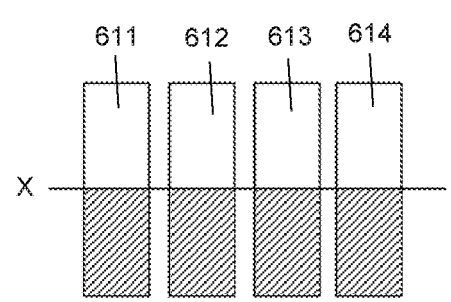
Figure 6E:
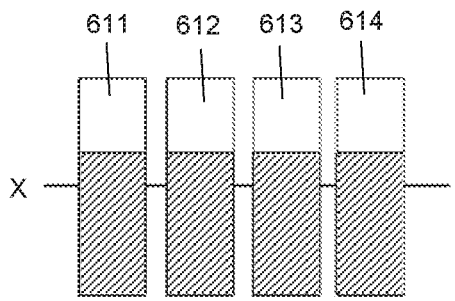

FIGS. 6(a) to 6(e) show braking pressure applied in response to a particular braking request by each of the four brake groups 611-614, in respect of five different scenarios shown in FIGS. 6(a), (b), (c), (d) and (e). The line X represents a pressure level corresponding to a predefined braking intensity limit. In this example the predefined braking intensity limit is an anti-skid braking intensity limit, which is set at a level such that a request braking intensity equal to the anti-skid braking intensity level can be achieved by a single brake group applying a pressure equal to X. However; in other examples the braking intensity limit may be set based on other considerations, such as preventing excessive asymmetric loading of the landing gear, or any other form of excessive loading of an aircraft structure. In the particular example, a brake de-selection function is configured to select one of the four brake groups to be active for each brake application, and to de-select the remaining three brake groups.

In scenario (a), a requested brake intensity is low, and the requested amount of braking can be achieved by a single brake group applying a pressure below X. This corresponds to block 507 of FIG. 5, and in this scenario the controller 120 does not modify the operation of the brake de-selection function 110. In scenario (b) the requested brake intensity is equal to the anti-skid braking intensity limit, meaning that the requested amount of braking can be achieved by a single brake group applying a pressure equal to X. In this example the controller is configured to modify the operation of the brake de-selection function 110 only if the anti-skid braking intensity limit is exceeded, so as with scenario (a) the controller 120 does not modify the operation of the brake de-selection function.

In scenario (c), a requested braking intensity is greater than the anti-skid braking intensity limit, meaning that the requested amount of braking cannot be achieved by a single brake group applying a pressure less than or equal to X. This corresponds to block 506 of FIG. 5, in which the controller modifies the operation of the brake de-selection function 110 by activating at least one disabled brake. In scenario (c), the requested brake intensity is at a level such that the requested amount of braking can be achieved by applying a pressure equal to X with the brake group 611, and a pressure less than X with a single additional brake group. Therefore in scenario (c) the controller has activated brake group 612 in addition to brake group 611, to apply an appropriate amount of pressure to achieve the requested amount of braking. In this example, brake group 612 has been activated (rather than any of the other de-selected brake groups) because it has been identified by the controller as having a lowest group total energy input, in the manner described above. In general, if a number n of de-selected brake groups are to be activated, in this example the controller is configured to order the de-selected brake groups by group total energy input, and identify and activate the n lowest energy brake groups.

If, in scenario (c), the level of the requested braking intensity had been such that the requested amount of braking could not be achieved by applying a pressure equal to X with the brake group 611, and a pressure less than or equal to X with a single additional brake group, the controller would have activated one or more further brake groups as necessary to achieve the requested amount of braking without exceeding X for any of the brake groups. Scenario (d) illustrates a situation in which the level of the requested braking intensity is such that the requested amount of braking can be achieved by applying a pressure equal to X with all of the brake groups 611-612. Since in this example X corresponds to an anti-skid braking intensity limit, scenario (c) represents a maximum amount of braking achievable without risking skidding of the aircraft. In other examples in which X corresponds to a structural load related braking intensity limit, (c) would represent a maximum amount of braking achievable without the risk of damaging a structure of the aircraft through excessive loading of that structure.

In scenario (e), a requested braking intensity level is sufficiently high that it is not possible to achieve the requested amount of braking whilst maintaining all of the applied brake pressures below X. Scenario (e) may, for example, correspond to a requested braking intensity greater than a maximum braking intensity limit, in which case the controller will deactivate the brake de-selection function (as in block 505 of FIG. 5). In this scenario, the controller 120 is configured to apply all brakes of the vehicle with an equal pressure sufficient to achieve the requested amount of braking.

As discussed above, in some examples the braking request may comprise a time-varying signal, for which the requested braking intensity varies with time. It is therefore possible that any combination of scenarios (a)-(e) (and/or other scenarios not illustrated) may occur over the course of a single brake application.

In some examples, the controller 120 may be configured to modify the operation of the brake de-selection function 110 based on factors other than a requested braking intensity. For example, one such factor could be measured torque. A maximum torque limit may be defined and stored in a memory accessible to the controller 120, and the controller may monitor the torque being reacted by the brake during operation of the brake (e.g. by comparing received measured torque values to the maximum torque limit). If a measured torque value exceeds the maximum torque limit, the controller 120 may modify the operation of the brake de-selection function 110 in any of the manners described above. Another such factor could be brake fluid pressure, in examples in which the brake is hydraulically actuated (or brake clamping force, in examples in which the brake is electrically actuated). In some examples a maximum brake fluid pressure limit (or a maximum brake clamping force)

may be defined, and the controller 120 may be configured to receive brake fluid pressure/clamping force measurements in respect of the brake, e.g. from a brake fluid pressure sensor or clamping force sensor of the vehicle. The controller 120 may monitor the brake fluid pressure (or clamping force) of the brake during operation of the brake (e.g. by comparing received brake fluid pressure/clamping force values to the maximum brake fluid pressure/clamping force limit), and if a measured value exceeds the maximum brake fluid pressure/clamping force limit, the controller 120 may modify the operation of the brake de-selection function 110 in any of the manners described above.

Figure 7:
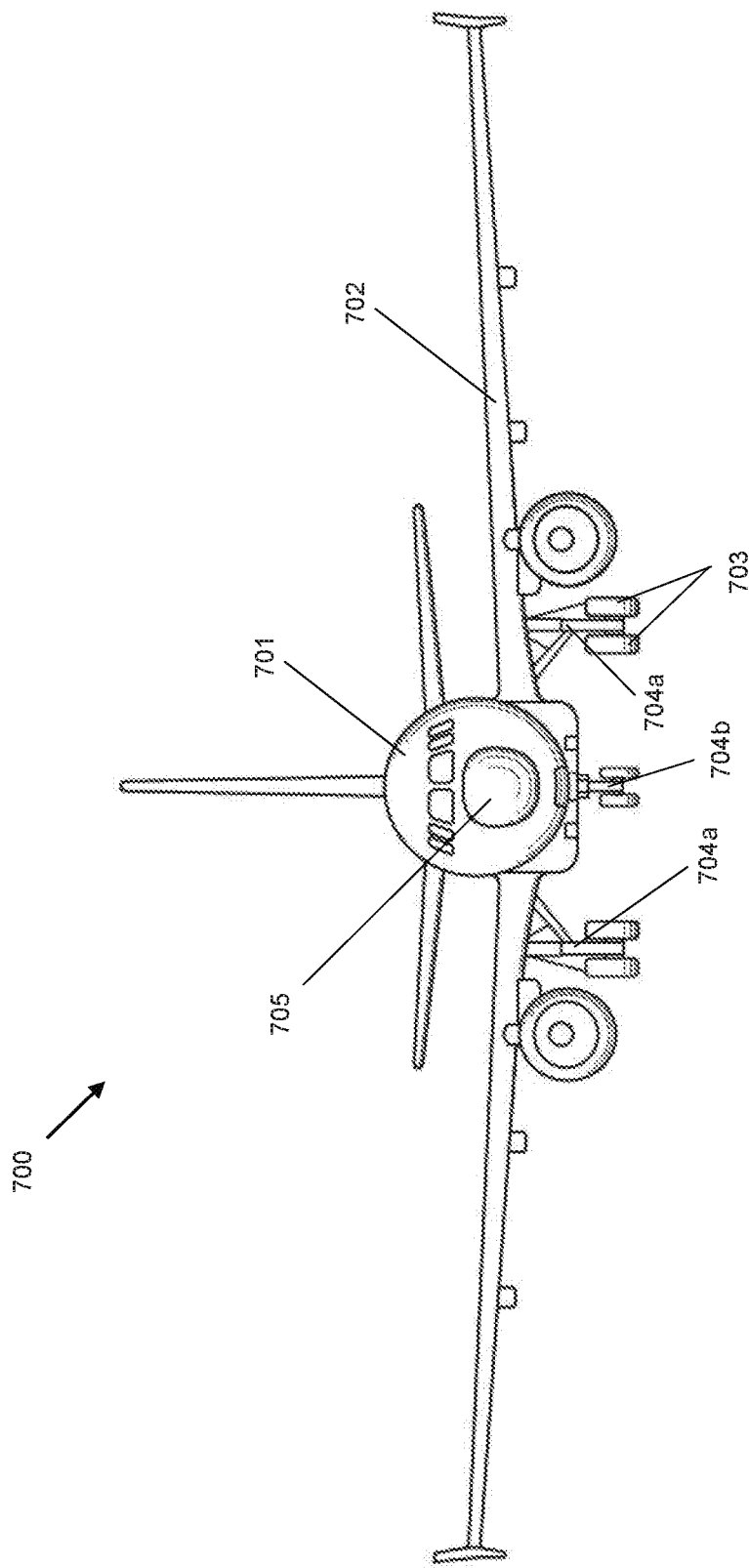
FIG. 7 is a schematic view of an example aircraft comprising an example apparatus for reducing brake wear.

FIG. 7 shows an aircraft 700 on which an apparatus according to the examples (e.g. the apparatus 100) is installed. The aircraft comprises a fuselage 701, wings 702, a pair of main landing gear 704*a*, and a nose landing gear 704*b*. Two wheels 703 are attached to each landing gear 704*a*, 704*b*, via an axle. The wheels 703 on the main landing gear 704*a* each have an associated brake (not shown). The nose wheels are not braked. The aircraft 700 further comprises an apparatus for reducing brake wear (not shown). The aircraft 700 further comprises a torque sensor (not shown) configured to measure a torque reacted by a brake of the aircraft and to transmit a torque measurement to the apparatus. Indeed, the in the particular example of FIG. 7, four such torque sensors are provided (one in respect of each brake of the aircraft). The aircraft 700 further comprises wheel speed sensor (not shown) configured to measure the speed of a wheel associated with the brake and to transmit a wheel speed measurement to the apparatus. In the particular example a wheel speed sensor is provided in respect of each braked wheel. The torque sensor and the wheel speed sensor may have any of the features of the torque sensor 111 and wheel speed sensor 112 described above.

The aircraft 700 further comprises an avionics system 705, and in the particular example the apparatus is comprised in the avionics system 705. The avionics system 705 is located in an avionics bay or compartment. In the particular example the avionics bay is in the nose of the aircraft below the cockpit, but it may be in a different location depending on the type of aircraft. The avionics system 705 comprises the electronic systems associated with flying the aircraft, including airborne communication and navigation systems and flight control systems and braking systems. The avionics system 705 may comprise all of the electronics associated with communicating information to other parts of the aircraft 700.

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention is:

1. An apparatus for reducing brake wear, the apparatus comprising:
   wheels on an aircraft;
   a brake associated with each of the wheels,
   a controller configured to perform a brake de-selection function by, responsive to a braking request, selecting an operational state of a given brake of the brakes to be one of operational and disabled based on a total energy input to the given brake during and after a landing of the aircraft.

2. The apparatus according to claim 1, wherein the aircraft taxies after the landing, and the selection of the operational state of the given brake is based on the total energy input during the landing and during the taxiing of the aircraft.

3. The apparatus according to claim 1, wherein the controller is configured to calculate the total energy input into each of the brakes, based on received torque measurements and received wheel speed measurements for each of the brakes.

4. The apparatus according to claim 3, wherein the total energy input into each of the brakes is continuously or periodically updated during the time the brake de-selection function is being performed.

5. The apparatus according to claim 1, wherein:
   the controller is configured to access a memory storing information defining at least two brake groups, each defined brake group being a different subset of the brakes;
   the given brake is in a given brake group of the at least two brake groups, and
   the selection is based on total energy input to the given brake and total energy input to each other brake in the given brake group during and after the landing.

6. The apparatus according to claim 5, wherein the brakes in one of the brake groups are located on the aircraft such that one of the brake groups comprises a symmetrical arrangement of the brakes with respect to an intended direction of travel of the aircraft.

7. The apparatus according to claim 5, wherein the controller is configured to select the same operational state for all of the brakes in the given defined brake group.

8. The apparatus according to claim 5, wherein the controller is configured to: determine, for each of the defined brake groups, a group energy input value, based on the energy input to each of the brakes in the defined brake group during and after the landing; identify one of the defined brake groups as having a lowest group energy input value; and select the operational state of the given brake of the aircraft by: selecting the operational state of the given brake to be operational if the given brake is comprised in the identified defined brake group; and selecting the operational state of the given brake to be disabled if the given brake is not comprised in the identified defined brake group.

9. The apparatus according to claim 8, wherein the controller is configured to determine the group energy input value for the given defined brake group of the brake groups by at least one of:
   determining a group energy input value to be an average of the energy input into each of the brakes in the given defined brake group during and after the landing; and
   determining a group energy input value to be equal to the highest energy input into an individual one of the brakes in the given defined brake group during and after the landing.

* * * * *